W. H. McLAUGHLIN & R. E. BABCOCK.
FASTENING MEANS.
APPLICATION FILED FEB. 20, 1918.
1,281,620.
Patented Oct. 15, 1918.
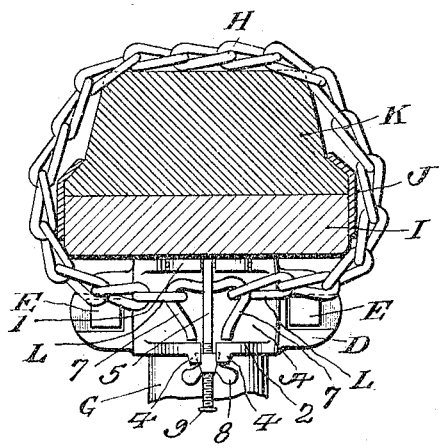
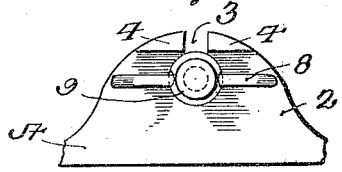
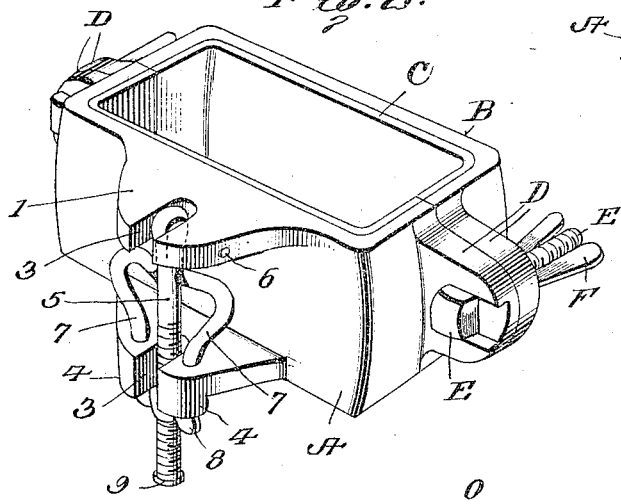
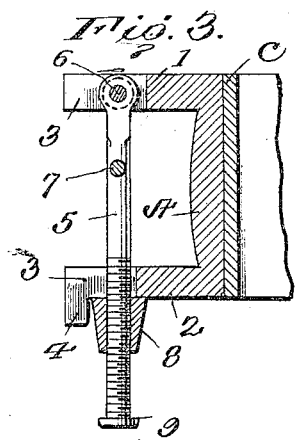
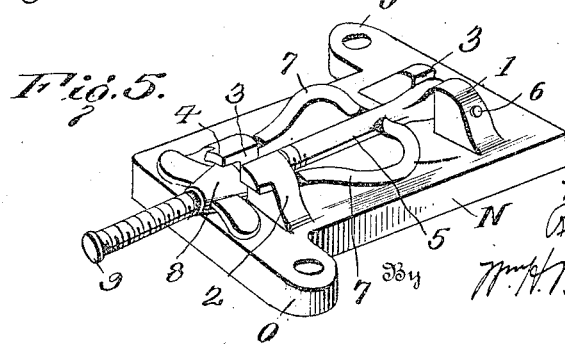
Inventors
William H. McLaughlin
Richard E. Babcock
By Wm. H. Babcock & Son
Attorneys

UNITED STATES PATENT OFFICE.

WILLIAM H. McLAUGHLIN, OF HARTFORD, CONNECTICUT, AND RICHARD E. BABCOCK, OF BARCROFT, VIRGINIA, ASSIGNORS, BY DIRECT AND MESNE ASSIGNMENTS, TO CASSIUS S. CHASE, OF HARTFORD, CONNECTICUT.

FASTENING MEANS.

1,281,620.  Specification of Letters Patent.  Patented Oct. 15, 1918.

Application filed February 20, 1918. Serial No. 218,256.

*To all whom it may concern:*

Be it known that we, WILLIAM H. McLAUGHLIN and RICHARD E. BABCOCK, citizens of the United States, residing, respectively, at Hartford, in the county of Hartford and State of Connecticut, and at Barcroft, in the county of Alexandria and State of Virginia, have invented certain new and useful Improvements in Fastening Means, of which the following is a specification.

This invention relates to fastening means or clamps, more particularly to one of the plates or members of a two-plate clamp, and resides especially in the means for readily securing thereto or therein the links of a chain or part or parts of some elements or element, and in provision for locking said means in position.

The invention hereinafter set forth and described is intended primarily by applicants for use in attaching anti-skidding chains of the fixed point or anchored type, to the spokes or felly of an automobile truck wheel. However, the invention may be embodied in a number of forms to be fixed in position in various manners and, while primarily intended for use with anti-skidding devices, as above mentioned, it can be used equally well for a great variety of purposes.

The primary object of the present invention is to provide a plate with a pivotally mounted pin having strong side branches, forks or hooks and arranged at an interval from the parallel face of said plate and, in normal position, having portions located in slots in two rigid parts, which pin is to have releasable locking means permitting its lower or inner end to be released so that the bolt may be turned forwardly and upwardly or outwardly on its pivot in order that the free ends of the branches, forks or hooks may be swung clear of the lower flange for the application thereto or removal therefrom of the links of an anti-skidding, or other, chain.

A further object is to so form the bolt, clamp-plate and locking means that the three elements will constitute a self-contained unit, no part of which can become separated, by manipulation by hand or with a wrench or other ordinary tool, and so lost. Applicants have in view the fact that, in the primary use for which they intended it, it will fall into the hands of many persons not mechanically inclined and who might separate the parts, without need, and lose them, and guard against this.

In the accompanying drawing:

Figure 1 represents a front elevation of a device embodying our invention as applied to the spoke of a wheel for the attachment of the ends of an anti-skidding chain, the use primarily in view by applicants;

Fig. 2, a perspective view of the same, by itself;

Fig. 3, a transverse sectional view through the front plate of the clamp;

Fig. 4, a detail bottom plan view of the front plate, broken away; and

Fig. 5, a perspective view of a modified form.

Referring now in detail to the drawings, A and B indicate the respective front and rear clamp plates having rubber treated lining C and provided with perforated end flanges D for the reception of bolts E on which wing nuts F are screwed to draw the two plates toward each other on some intervening object, for instance the spoke G of a wheel. H indicates the anti-skidding chain, which passes around the felly I, rim J and tire K and has its two terminal links L passed over the lower or inner ends of the hooks or forks 7 preferably formed integral with bolt 5, which has its upper or outer end preferably pivotally mounted in slot 3 of flange 1 preferably by means of a pin 6 passing longitudinally through said flange 1 and the end of said bolt.

Of course any endless article might be anchored by these forks or hooks 7.

These branches or hooks 7 are preferably of such length that in normal position their free ends will be at a very slight interval, say the thickness of a sheet of newspaper, from the upper or outer face of flange 2, which flange is provided with a slot 3 registering with the slot 3 of flange 1, the slot in flange 2 receiving a portion of bolt 5 when the latter is in normal position. In Fig. 1 this interval between the free ends of the forks or hooks 7 and the upper face of flange 2 is exaggerated to make it clear that there is a slight interval in order that the bolt 5 may turn on pin 6.

The flanges 1 and 2 will preferably be parallel to each other and at right angles to the face of plate A.

The forward portion of said flange 2 is provided on its under or inner face with two lugs 4 adjacent the forward end of, and on opposite sides of, slot 3, and a wing nut 8, working on the screw-threaded portion of bolt 5, is adapted to be turned up tight on said bolt so that said nut 8 is in firm frictional engagement with the lower face of flange 2. This nut 8 is preferably round and of such diameter that it spans generously the slot 3 and will extend laterally of each of the lugs 4, so that after this nut 8 is turned down on the bolt 5 to a point where the distance between the upper face of said nut 8 and the axial line of pin 6 is less than the distance between the lower edges of lugs 4 and the axial line of said pin 6, it is obvious that the bolt 5 can have no pivotal movement on pin 6 until the nut 8 is unscrewed to a point where its upper face, in describing an arc with the pin 6 as its center, will clear the lower edges of lugs 4.

In assembling, the upper or outer end of bolt 5 is correctly positioned in the slot 3 of flange 1 and the pivot pin 6 is then inserted and its ends upset to prevent it from coming out or being easily driven out with any ordinary tool. The nut 8 is then screwed on to the free and threaded end portion of the bolt 8 and the extreme free end is upset as at 9 to guard against the removal of the nut 8 therefrom.

In operation, assuming the parts to be in normal position, as shown in the drawings, to apply chain links thereto, it is necessary to loosen the nut 8 until it will clear the lower edges of the lugs 4, when the bolt is to be swung forward and upward on the pin 6, moving the free ends of the forks or hooks 7 clear of the upper face of flange 2, so that chain links L may be slipped over them, when the bolt 5 is to be swung in the reverse direction until it lies in a plane parallel to the adjacent face of the plate A, with a portion lying in the slot 3 of flange 2. The nut 8 will then be tightened up so as to engage the lower face of flange 2, to prevent rattling, and to fit behind the lugs 4 so as to prevent any swinging movement of the bolt 5.

In this, the normal position, the interval between the bolt 5 and the free ends of the hooks or forks 7 will be closed or bridled by the upper face of the flange 2 against the passage either way of a chain link or similar article.

In the modification shown in Fig. 5 all parts are the same excepting that the plate N thereof is of different form and provided at each end, on opposite sides with perforated lugs O by which it may be bolted directly to the felly of a wheel, or to some other object. Of course when attached to the felly of a wheel the bolt 5 of this form will move in a plane at right angles to the plane of movement of the bolt of the preferred form.

Any suitable materials may be used, though it may be as well to state that the bolt 5 with its branches, forks or hooks 7 will preferably be formed by drop-forging, and also that the branches or hooks 7 will preferably be so formed that the line of pull or strain will be at the point where said forks or hooks 7 join the bolt 5, as clearly shown in the drawings, to avoid any unnecessary leverage tending to break the hooks or branches 7 at this point.

Having thus described our invention, what we claim as new and desire to secure by Letters Patent is:

1. A plate having two slotted flanges, in combination with a bolt pivotally mounted in the slot in one flange and having a portion lying in the slot in the other flange, branches mounted on said bolt and having their free ends at intervals therefrom, said intervals being closed against the ingress or egress of an endless article by the adjacent face of the second mentioned flange.

2. A plate and a slotted flange, in combination with a bolt pivotally mounted in said plate, having a portion normally lying in the slot of said flange and provided with forks having their free ends adjacent said bolt and adjacent the face of said flange, which closes the openings between said forks and bolt against the ingress or egress of an endless article, and means for locking said bolt in normal position.

3. Two parts fixedly mounted with relation to, and at an interval from, each other, in combination with a third element pivotally connected to one of said parts, provided with hooks having their free ends closed by the other of said parts against the ingress or egress of an endless article and having a portion engaging said part, and means for locking said element in such position.

4. A plate having a slotted portion, in combination with a part pivotally connected to said plate and provided with hooks the free ends of which, in normal position, are closed by the adjacent portions of said plate against the ingress or egress of an endless article, and means moving longitudinally of said part for locking the same in normal position.

5. A plate having a slotted flange and another flange, in combination with a part connected for movement with the last mentioned flange and having a portion adapted to lie in the slot of said slotted flange, lugs formed on said slotted flange, hooks mounted on said part, and means working on said part and adapted to engage said lugs to lock said part in normal position wherein the free ends of said hooks are guarded by a relatively fixed object.

6. A plate having two flanges, one of which is slotted, in combination with a bolt pivotally connected to one flange and having a part adapted to lie in the slot of the other, lugs formed on the lower face of said slotted flange on each side of the slot thereof, a nut screwing on said bolt and adapted to engage the rear faces of said lugs to lock said bolt in normal position and hooks formed with said bolt and in normal position having their free ends guarded by a relatively fixed object.

WILLIAM H. McLAUGHLIN.
RICHARD E. BABCOCK.

Copies of this patent may be obtained for five cents each, by addressing the "Commissioner of Patents, Washington, D. C."